US008471782B2

(12) United States Patent
Muklashy et al.

(10) Patent No.: US 8,471,782 B2
(45) Date of Patent: *Jun. 25, 2013

(54) SYSTEMS AND METHODS FOR MULTIPLE DISPLAY SUPPORT IN REMOTE ACCESS SOFTWARE

(75) Inventors: Shadi Muklashy, Pasadena, CA (US); Derek Piasecki, Goleta, CA (US); Brian Green, Santa Barbara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/290,949

(22) Filed: Nov. 7, 2011

(65) Prior Publication Data
US 2012/0050136 A1 Mar. 1, 2012

Related U.S. Application Data

(63) Continuation of application No. 11/542,623, filed on Oct. 2, 2006, now Pat. No. 8,054,241, which is a continuation-in-part of application No. 11/532,087, filed on Sep. 14, 2006, now Pat. No. 7,791,559.

(51) Int. Cl.
*G09G 5/00* (2006.01)
(52) U.S. Cl.
USPC ............................................ 345/1.1; 715/737
(58) Field of Classification Search
USPC ................................ 345/1.1–4; 715/737, 767
See application file for complete search history.

(56) References Cited

U.S. PATENT DOCUMENTS

| 4,807,029 A | 2/1989 | Tanaka et al. |
| 4,893,307 A | 1/1990 | McKay et al. |
| 4,928,247 A | 5/1990 | Doyle et al. |
| 4,937,036 A | 6/1990 | Beard et al. |
| 4,949,248 A | 8/1990 | Caro |

(Continued)

FOREIGN PATENT DOCUMENTS

| EP | 0475581 | 3/1992 |
| EP | 0645695 | 3/1995 |
| EP | 1469382 | 10/2004 |
| GB | 2327836 | 2/1999 |

OTHER PUBLICATIONS

"Remote Desktop Environments Reflected in Local Windows" IBM Technical Disclosure Bulletin, 36:421-426, Mar. 1993.

(Continued)

*Primary Examiner* — Stephen Sherman
(74) *Attorney, Agent, or Firm* — McDermott Will & Emery LLP

(57) ABSTRACT

A method of supporting multiple display configurations in a remote access environment, the remote access environment having a host computing device in communication with a viewer computing device comprises: receiving from a host computing device, by a viewer computing device having one or more viewer displays, a list of rectangles, each rectangle representing the boundaries of one of a plurality of host displays; presenting, by the viewer computing device to an end-user of the viewer computing device, a graphical user interface including means for selecting a configuration for displaying a window representing screen data of the plurality of host displays in the viewable area of the one or more displays of the viewer computing device; and displaying in the selected configuration, by the viewer computing device, the window representing the screen data of the one or more host displays. Corresponding systems are also described.

18 Claims, 10 Drawing Sheets

U.S. PATENT DOCUMENTS

| | | |
|---|---|---|
| 4,965,819 A | 10/1990 | Kannes |
| 4,974,173 A * | 11/1990 | Stefik et al. ............... 715/751 |
| 5,021,949 A | 6/1991 | Morten et al. |
| 5,062,060 A | 10/1991 | Kolnick et al. |
| 5,072,412 A | 12/1991 | Henderson, Jr. et al. |
| 5,241,625 A | 8/1993 | Epard et al. |
| 5,263,134 A * | 11/1993 | Paal et al. ............... 715/788 |
| 5,382,972 A | 1/1995 | Kannes |
| 5,408,655 A | 4/1995 | Oren et al. |
| 5,437,025 A | 7/1995 | Bale et al. |
| 5,572,643 A | 11/1996 | Judson |
| 5,577,188 A | 11/1996 | Zhu |
| 5,619,638 A | 4/1997 | Duggan et al. |
| 5,757,925 A | 5/1998 | Faybishenko |
| 5,758,110 A | 5/1998 | Boss et al. |
| 5,761,656 A | 6/1998 | Ben-Shachar |
| 5,768,614 A | 6/1998 | Takagi et al. |
| 5,802,206 A | 9/1998 | Marold et al. |
| 5,835,090 A | 11/1998 | Clark et al. |
| 5,838,300 A | 11/1998 | Takagi et al. |
| 5,838,906 A | 11/1998 | Doyle et al. |
| 5,886,707 A | 3/1999 | Berg |
| 5,896,500 A | 4/1999 | Ludwig et al. |
| 5,909,559 A | 6/1999 | So |
| 5,935,212 A | 8/1999 | Kalajan et al. |
| 5,968,132 A | 10/1999 | Tokunaga et al. |
| 5,983,190 A | 11/1999 | Trower, II et al. |
| 5,990,852 A | 11/1999 | Szamrej |
| 5,999,525 A | 12/1999 | Krishnaswamy et al. |
| 6,006,242 A | 12/1999 | Poole et al. |
| 6,052,120 A | 4/2000 | Nahi et al. |
| 6,081,623 A | 6/2000 | Bloomfield et al. |
| 6,157,935 A | 12/2000 | Tran et al. |
| 6,166,729 A | 12/2000 | Acosta et al. |
| 6,199,753 B1 | 3/2001 | Tracy et al. |
| 6,202,060 B1 | 3/2001 | Tran |
| 6,233,617 B1 | 5/2001 | Rothwein et al. |
| 6,263,363 B1 | 7/2001 | Rosenblatt et al. |
| 6,317,761 B1 | 11/2001 | Landsman et al. |
| 6,366,933 B1 | 4/2002 | Ball et al. |
| 6,400,996 B1 | 6/2002 | Hoffberg et al. |
| 6,483,515 B1 | 11/2002 | Hanko |
| 6,539,429 B2 | 3/2003 | Rakavy et al. |
| 6,584,493 B1 | 6/2003 | Butler |
| 6,601,087 B1 | 7/2003 | Zhu et al. |
| 6,640,145 B2 | 10/2003 | Hoffberg et al. |
| 6,658,464 B2 | 12/2003 | Reisman |
| 6,687,745 B1 | 2/2004 | Franco et al. |
| 6,710,753 B2 * | 3/2004 | Gillespie et al. ............... 345/2.1 |
| 6,735,601 B1 | 5/2004 | Subrahmanyam |
| RE38,609 E | 10/2004 | Chen et al. |
| 6,850,252 B1 | 2/2005 | Hoffberg |
| 6,917,348 B2 | 7/2005 | Demsky et al. |
| 6,920,502 B2 | 7/2005 | Araujo et al. |
| 6,967,972 B1 | 11/2005 | Volftsun et al. |
| 7,006,881 B1 | 2/2006 | Hoffberg et al. |
| 7,035,907 B1 | 4/2006 | Decasper et al. |
| 7,076,736 B2 | 7/2006 | Hugh |
| 7,080,127 B1 | 7/2006 | Hickman et al. |
| 7,098,868 B2 | 8/2006 | Love et al. |
| 7,100,069 B1 | 8/2006 | Hickman et al. |
| 7,116,894 B1 | 10/2006 | Chatterton |
| 7,176,943 B2 * | 2/2007 | Meyers et al. ............... 345/619 |
| 7,197,234 B1 | 3/2007 | Chatterton |
| 2001/0047406 A1 | 11/2001 | Araujo et al. |
| 2002/0016827 A1 | 2/2002 | McCabe et al. |
| 2002/0029285 A1 | 3/2002 | Collins |
| 2002/0032725 A1 | 3/2002 | Araujo et al. |
| 2002/0149617 A1 | 10/2002 | Becker |
| 2003/0055896 A1* | 3/2003 | Hu et al. ............... 709/205 |
| 2003/0093466 A1 | 5/2003 | Jarman et al. |
| 2003/0191799 A1 | 10/2003 | Araujo et al. |
| 2003/0208529 A1 | 11/2003 | Pendyala et al. |
| 2004/0002048 A1 | 1/2004 | Thurmaier et al. |
| 2004/0017394 A1 | 1/2004 | Adachi |
| 2004/0046787 A1 | 3/2004 | Henry et al. |
| 2004/0268357 A1 | 12/2004 | Joy et al. |
| 2004/0268358 A1 | 12/2004 | Darling et al. |
| 2005/0046637 A1* | 3/2005 | Mondal ............... 345/547 |
| 2005/0210118 A1 | 9/2005 | Hickman et al. |
| 2005/0286466 A1 | 12/2005 | Tagg et al. |
| 2006/0028479 A1 | 2/2006 | Chun et al. |
| 2006/0282520 A1 | 12/2006 | Hickman et al. |
| 2007/0038955 A1 | 2/2007 | Nguyen |
| 2007/0159491 A1 | 7/2007 | Panabaker et al. |

OTHER PUBLICATIONS

International Search Report for Corresponding International Application No. PCT/US2007/021098, Mailed Feb. 22, 2008, 4 Pages.

Written Opinion for Corresponding International Application No. PCT/US2007/021098, Mailed Feb. 22, 2008, 5 Pages.

* cited by examiner

SYSTEMS AND METHODS FOR MULTIPLE DISPLAY SUPPORT IN REMOTE ACCESS SOFTWARE

CROSS-REFERENCE TO RELATED APPLICATIONS

The present application is a continuation of U.S. application Ser. No. 11/542,623, filed Oct. 2, 2006, which is a continuation-in-part of U.S. application Ser. No. 11/532,087, filed Sep. 14, 2006, the entire disclosure of which is incorporated by reference as if set forth in its entirety herein.

FIELD OF THE INVENTION

The present invention relates to systems and methods for remote access of a computing device, and, in particular, the efficient display and navigation of graphical information corresponding to a plurality of host displays.

BACKGROUND OF THE INVENTION

Existing remote access software allows a user of a remote computer to interact with a host computer over a network connection as if the user were seated at the host computer. However, complications may arise when a host computer has more than one display. If the remote computer has a different number of displays, or displays of different sizes or configurations, the user may have difficulty remotely navigating the host computer's displays. While the user may be able to alter the display settings of the host computer using the remote access software, this may involve significant effort, may disrupt the user's existing settings, and may still fail to resolve differences between the display configurations of the host computer and the remote computer.

Thus, there exists a need for remote access software which supports multiple display configurations, and resolves differences in display number, type, or configuration between a viewer computer and a host computer.

SUMMARY OF THE INVENTION

In one aspect, the present invention provides a method for remotely viewing at least part of a first plurality of displays at a computing device, the computing device having at least one viewer display. Information corresponding to at least one image presented on at least part of the first plurality of displays is received at the computing device. A control derived from the received information is presented on at least one viewer display. A part of the control is selected and a portion of the at least one image presented on at least part of the first plurality of displays relating to the selected part of the control is displayed on at least one viewer display. The control includes at least part of a scaled version of the at least one image presented on at least part of the first plurality of displays. In an alternate embodiment, the control may be an appropriately sized or proportioned polygon of a uniform color. The method may further include updating the control in response to an update in an image presented at the first plurality of displays, for example, updating the control in real time.

In one embodiment, the received information includes the image presented on at least part of the first plurality of displays. In another embodiment, the received information includes at least one record representing a rectangle corresponding to the boundaries of one of the first plurality of displays. The received information may optionally be compressed.

The control may be presented in response to an action performed by an end user, such as a keypress or a mouse click. The control may be presented in a predetermined location or a location determined by an end user. In one embodiment, the control includes at least one image, with each image corresponding to an image displayed by one of the first plurality of displays.

In another aspect, the present invention provides a computer implemented system for remote access having a host computing device with a first plurality of displays in communication with a viewer computing device via a network. The system includes a viewer computing device having a transceiver which receives, from a host computing device, information corresponding to at least one image presented on at least part of the first plurality of displays, and at least one viewer display which displays a control derived from the received information and a user interface that allows a user to select part of that control, displaying on at least one viewer display a portion of the at least one image presented on at least part of the first plurality of displays relating to the selected part of the control utilizing the received information. The control includes at least part of a scaled version of the at least one image presented on at least part of the first plurality of displays. In one embodiment, the number of host displays equals the number of viewer displays.

In another embodiment, the viewer computing device comprises a plurality of viewer displays that display in at least two of the viewer displays the portion of the at least one image presented on at least part of the first plurality of displays. In another embodiment, the viewer computing device has a single viewer display that displays images from at least part of a selected one of the plurality of host displays. In still another embodiment, the viewer computing device has a single viewer display that scales the screen data of each of the host displays such that the screen data for each display is displayed on the viewer display.

The foregoing and other features and advantages of the present invention will be made more apparent from the description, drawings, and claims that follow.

BRIEF DESCRIPTION OF DRAWINGS

The advantages of the invention may be better understood by referring to the following drawings taken in conjunction with the accompanying description in which.

In the drawings, like reference characters generally refer to corresponding parts throughout the different views. The drawings are not necessarily to scale, emphasis instead being placed on the principles and concepts of the invention.

DETAILED DESCRIPTION OF THE INVENTION

Figure 1:
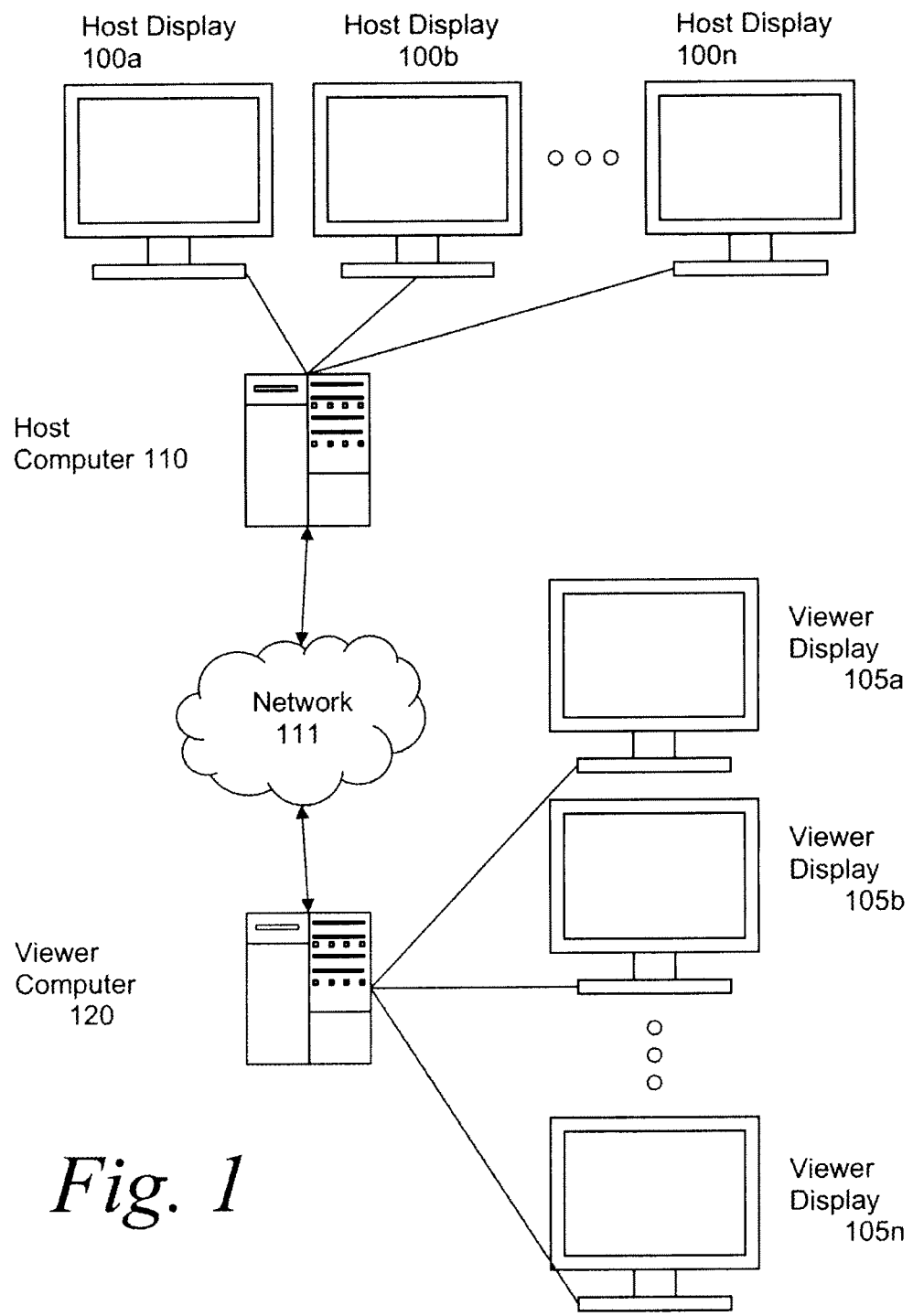
FIG. 1 is a block diagram of a network supporting multiple display configurations in a remote access environment.

With reference to FIG. 1, a block diagram of a network of computers supporting multiple display configurations in a remote access environment is shown. In brief overview, a host computer 110 is connected to a number of host displays 100a, 100b, . . . 100n (generally 100). The host computer is connected via a network 111 to a viewer computer 120. The viewer computer in turn has a number of viewer displays 105a, 105b, . . . 105n (generally 105). The viewer computer 120 may have the same number of displays 105 as the host computer 110, or the viewer computer 120 may have more or fewer displays 105 than the host computer 110. Using software in accord with one embodiment of the present invention, the viewer computer 120 may receive and display screen data corresponding to that of the host computer 110 and one or more host displays 100.

In various embodiments the network 111 may be a personal area network (PAN), local-area network (LAN), medium-area network (MAN), or a wide area network (WAN) such as the Internet or the World Wide Web. The network 111 may utilize any connections including standard telephone lines, LAN or WAN links (e.g., T1, T3, 56 kb, X.25), broadband connections (e.g., ISDN, Frame Relay, ATM), and wireless connections (e.g., IEEE 802.11 and Bluetooth). The viewer computer 120 may communicate with the host 110 through the network 111 using any communication protocol, including without limitation TCP/IP, IPX, SPX, NetBIOS, NetBEUI, SONET, SDH, and direct asynchronous protocols. The protocols used to communicate through the network 111 can include any variety of protocols used for long haul or short haul transmission. The network 111 may include mobile telephone networks utilizing any protocol or protocols used to communicate among mobile devices, including AMPS, TDMA, CDMA, GSM, GPRS or UMTS. The network 111 may subsume the Internet. As used herein, the Internet refers to the electronic communications network that connects computer networks and organizational computer facilities around the world.

The viewer computer 120 can be any personal computer, server, Windows-based terminal, Network Computer, wireless device, information appliance, RISC Power PC, X-device, workstation, minicomputer, personal digital assistant (PDA), mainframe computer, cellular telephone or other computing device that provides sufficient faculties to execute viewer software and an operating system. Viewer software of the invention facilitates displaying a representation of a screen display of the host computing device 110 and provides a facility to configure the representation to encompass the display of one or more host displays 105. As used herein, data refers to any digital representation of information. Examples of data include, but are not limited to files, folders, e-mails, instant messages (IM), audio files, video files, profiles, drivers, programs, and other electronic embodiments of information. The viewer computer 120 may also be referred to as the viewer 120, or the viewer computing device 120.

The host computer 110 can be any type of computing device that is capable of communication with the viewer 120. For example, the host computing device 110 may be any of the computing devices suitable to operation as viewer computing devices 120. In addition, the host computing device 110 can be any other computing device that provides sufficient faculties to execute host software and an operating system. The host software of the invention provides a facility to transmit a representation of host screen data to a viewer computer 120. The host computer 110 may also be referred to as the host 110, or the host computing device 110.

The viewer computer 120 and host 110 can communicate directly with each other or through an intermediary computing or communication device. For example, in some embodiments a communication server may facilitate communications between the viewer 120 and the host 110. The communications server can provide a secure channel using any number of technologies to provide communications between the viewer 120 and the host 110. One remote access product that currently uses such a communication scheme is GOTOMYPC offered by Citrix Online, LLC, of Santa Barbara, Calif. Certain aspects and features of the invention described below can be embodied in such a service. Other services that can include features of the invention can include, but are not limited to, TERMINAL SERVICES, provided by Microsoft Corporation, of Redmond, Wash., PRESENTATION SERVER, provided by Citrix Systems, Inc. of Ft. Lauderdale, Fla., WEBEX PCNOW offered by WebEx Communications, Inc. of Santa Clara, Calif., LOGMEIN offered by 3 am Labs, Inc. of Woburn, Mass., REMOTELY ANYWHERE also offered by 3 am Labs, and PROVISION MANAGEMENT FRAMEWORK offered by Provision Networks.

The host displays 100 and viewer displays 105 may be any device capable of displaying graphical data. Examples of host displays 100 or viewer displays 105 may include computer monitors, LCD screens, CRTs, televisions, and projectors. The host displays 100 and viewer displays 105 may be any resolution, including without limitation CGA, VGA, SVGA, SXGA+, UGA, XGA, XVGA, QVGA, UXGA, QSXGA, QUXGA, WXGA, SXGA, WSXGA, WUXGA, and QSXGA. In some embodiments, a host computer 110 or viewer computer 120 may use specialized hardware such as a graphics card to communicate with the respective displays.

Figure 2A:
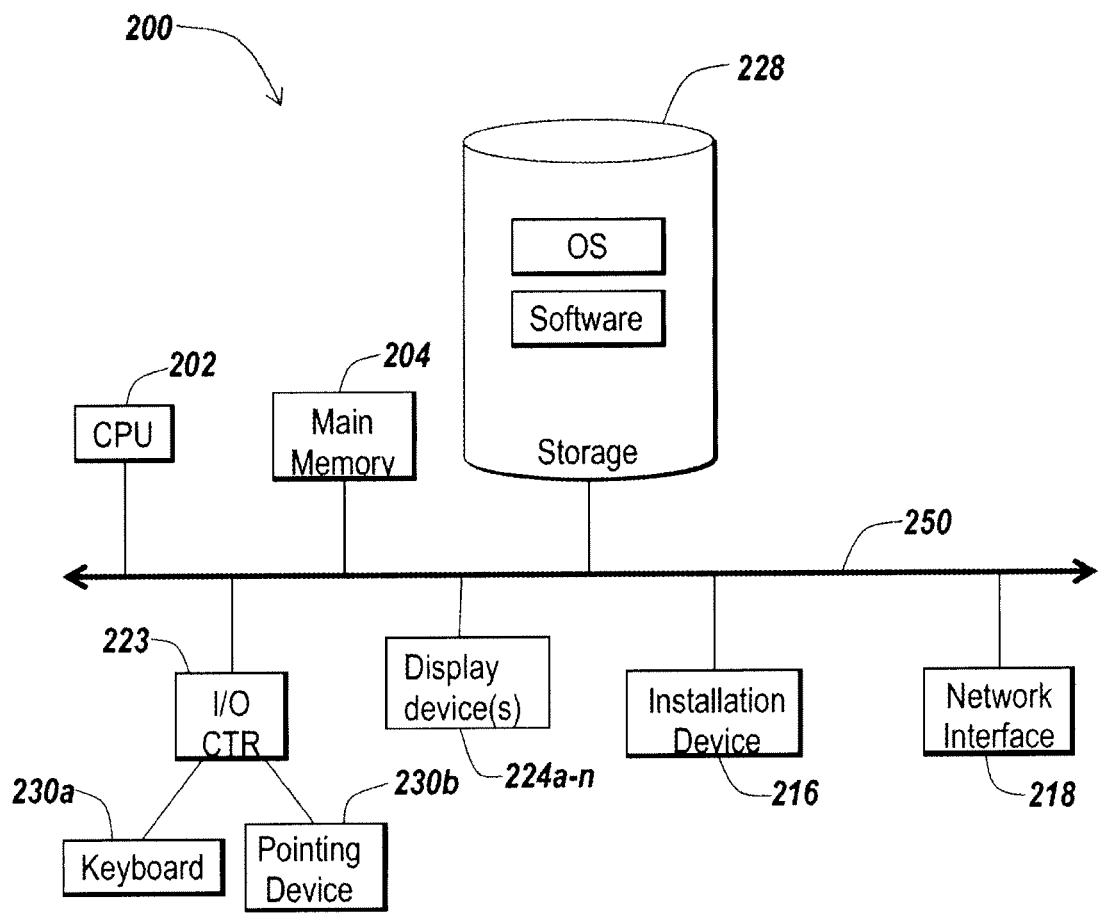
FIGS. 2A and 2B depict block diagrams of a typical computer suited for use as a host computing device or a viewer computing device.
Figure 2B:
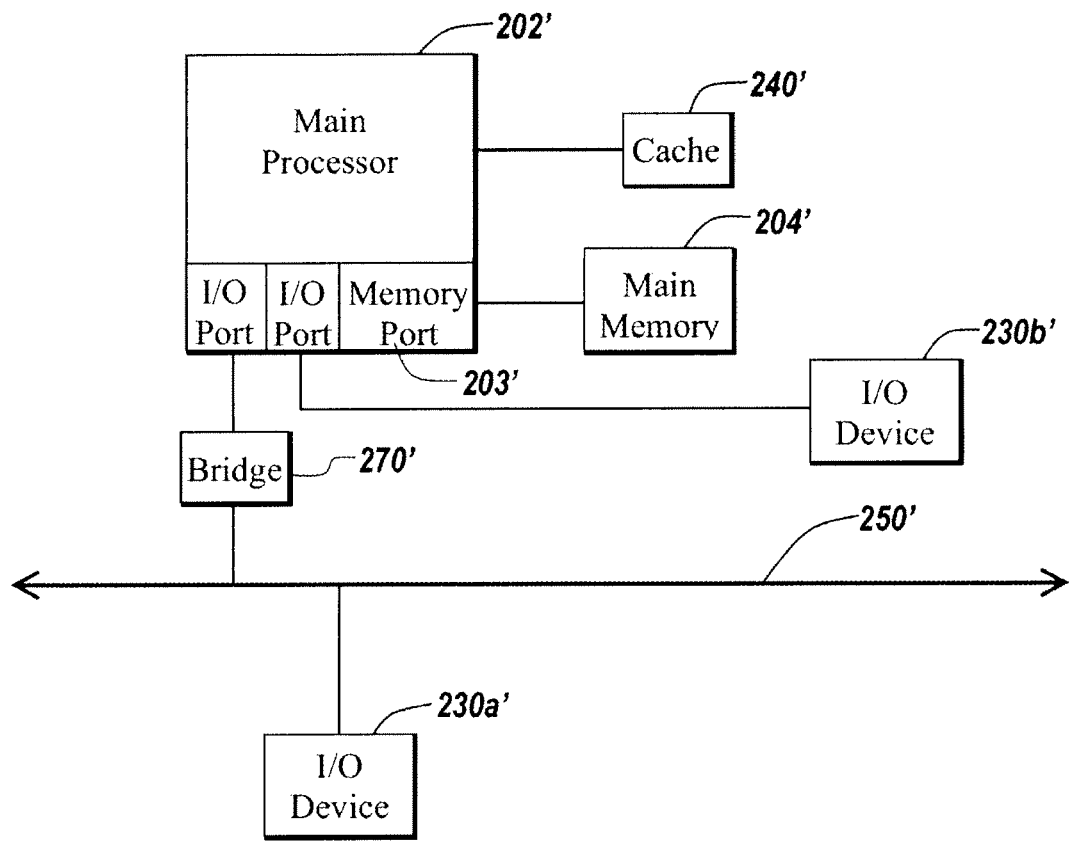

FIGS. 2A and 2B depict block diagrams of typical computers 200 and 200' useful as host computing devices 110 and viewer computing devices 120. As shown in FIGS. 2A and 2B, each computer 200, 200' includes a central processing unit 202, 202' and a main memory unit 204, 204'. Each computer 200 may also include other optional elements, such as one or more input/output devices 230a-230b, 230a'-230b' (generally referred to using reference numerals 230, 230'), and an optional external cache memory 240 in communication with the central processing unit 202'.

The central processing unit 202, 202' is any logic circuitry that responds to and processes instructions fetched from the main memory unit 204, 204'. In many embodiments, the central processing unit is provided by a microprocessor unit, such as those manufactured by Intel Corporation of Mountain View, Calif.; those manufactured by Motorola Corporation of Schaumburg, Ill.; the Crusoe and Efficeon lines of processors manufactured by Transmeta Corporation of Santa Clara, Calif.; the lines of processors manufactured by International Business Machines of White Plains, N.Y.; or the lines of processors manufactured by Advanced Micro Devices of Sunnyvale, Calif.

Main memory unit 204, 204' may be one or more memory chips capable of storing data and allowing any storage location to be directly accessed by the microprocessor 202, 202', such as static random access memory (SRAM), burst SRAM or synchburst SRAM (BSRAM), dynamic random access memory (DRAM), fast page mode DRAM (FPM DRAM), enhanced DRAM (EDRAM), extended data output RAM (EDO RAM), extended data output DRAM (EDO DRAM), burst extended data output DRAM (BEDO DRAM), enhanced DRAM (EDRAM), synchronous DRAM (SDRAM), JEDEC SRAM, PC100 SDRAM, double data rate SDRAM (DDR SDRAM), enhanced SDRAM (ESDRAM), SyncLink DRAM (SLDRAM), direct Rambus DRAM (DRDRAM), or ferroelectric RAM (FRAM). In the embodiment shown in FIG. 2A, the processor 202 communicates with main memory 204 via a system bus 250 (described in more detail below). FIG. 2B depicts an embodiment of a computer system 200' in which the processor communicates directly with main memory 204' via a memory port 203. For example, in FIG. 2B the main memory 204' may be DRDRAM.

FIG. 2B depicts an embodiment in which the main processor 202' communicates directly with cache memory 240' via a secondary bus, sometimes referred to as a "backside" bus. In other embodiments, the main processor 202' communicates with cache memory 240' using the system bus 250'. Cache memory 240 typically has a faster response time than main memory 204 and is typically provided by SRAM, BSRAM, or EDRAM.

In the embodiment shown in FIG. 2A, the processor 202 communicates with various I/O devices 230 via a local system bus 250. Various busses may be used to connect the central processing unit 202 to the I/O devices 230, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is an video display, the processor 202 may use an Advanced Graphics Port (AGP) to communicate with the display. FIG. 2B depicts an embodiment of a computer system 200' in which the main processor 202' communicates directly with I/O device 230b' via HyperTransport, Rapid I/O, or InfiniBand. FIG. 2B also depicts an embodiment in which local busses and direct communication are mixed: the processor 202' communicates with I/O device 230a' using a local interconnect bus while communicating with I/O device 230b' directly.

A wide variety of I/O devices 230, 230' may be present in the computer system 200, 200'. Input devices include keyboards, mice, trackpads, trackballs, cameras, video cameras, microphones, and drawing tablets. Output devices include video displays, speakers, inkjet printers, laser printers, and dye-sublimation printers. An I/O device 230, 230' may also provide mass storage for the computer system 200 such as a hard disk drive, a floppy disk drive for receiving floppy disks such as 3.5-inch, 5.25-inch disks or ZIP disks, a CD-ROM drive, a CD-R/RW drive, a DVD-ROM drive, tape drives of various formats, and USB storage devices.

In further embodiments, an I/O device 230 may be a bridge between the system bus 250 and an external communication bus, such as a USB bus, an Apple Desktop Bus, an RS-132 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

General-purpose computers of the sort depicted in FIG. 2A and FIG. 2B typically utilize operating systems, which control the scheduling of tasks and access to system resources. Typical operating systems include MICROSOFT WINDOWS, manufactured by Microsoft Corp. of Redmond, Wash.; Macintosh Operating System, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, among others.

For embodiments concerning mobile devices, the device may be a JAVA-enabled cellular telephone, such as the i55sr, i58sr, i85s, or the i88s, all of which are manufactured by Motorola Corp. of Schaumburg, Ill.; the 6035 or the 7135, manufactured by Kyocera of Kyoto, Japan; or the i300 or i330, manufactured by Samsung Electronics Co., Ltd., of Seoul, Korea. In other embodiments concerning mobile devices, a mobile device may be a personal digital assistant (PDA) operating under control of the PalmOS operating system, such as the Tungsten W, the VII, the VIIx, the i705, all of which are manufactured by palmOne, Inc. of Milpitas, Calif. In further embodiments, the client 113 may be a personal digital assistant (PDA) operating under control of the PocketPC operating system, such as the iPAQ 4155, iPAQ 5555, iPAQ 1945, iPAQ 2215, and iPAQ 4255, all of which are manufactured by Hewlett-Packard Corporation of Palo Alto, Calif.; the ViewSonic V36, manufactured by ViewSonic of Walnut Creek, Calif.; or the Toshiba PocketPC e405, manufactured by Toshiba America, Inc., of New York, N.Y. In still other embodiments, the mobile device is a combination PDA/telephone device such as the Treo 180, Treo 270, Treo 600, Treo 650, Treo 700, or the Treo 700w, all of which are manufactured by palmOne, Inc. of Milpitas, Calif. In still further embodiments, the mobile device is a cellular telephone that operates under control of the PocketPC operating system, such as the MPx200, manufactured by Motorola Corp. A typical mobile device may include many of the elements described above in FIGS. 2A and 2B, including the processor 202, 202' and the main memory 204, 204'.

Figure 3A:
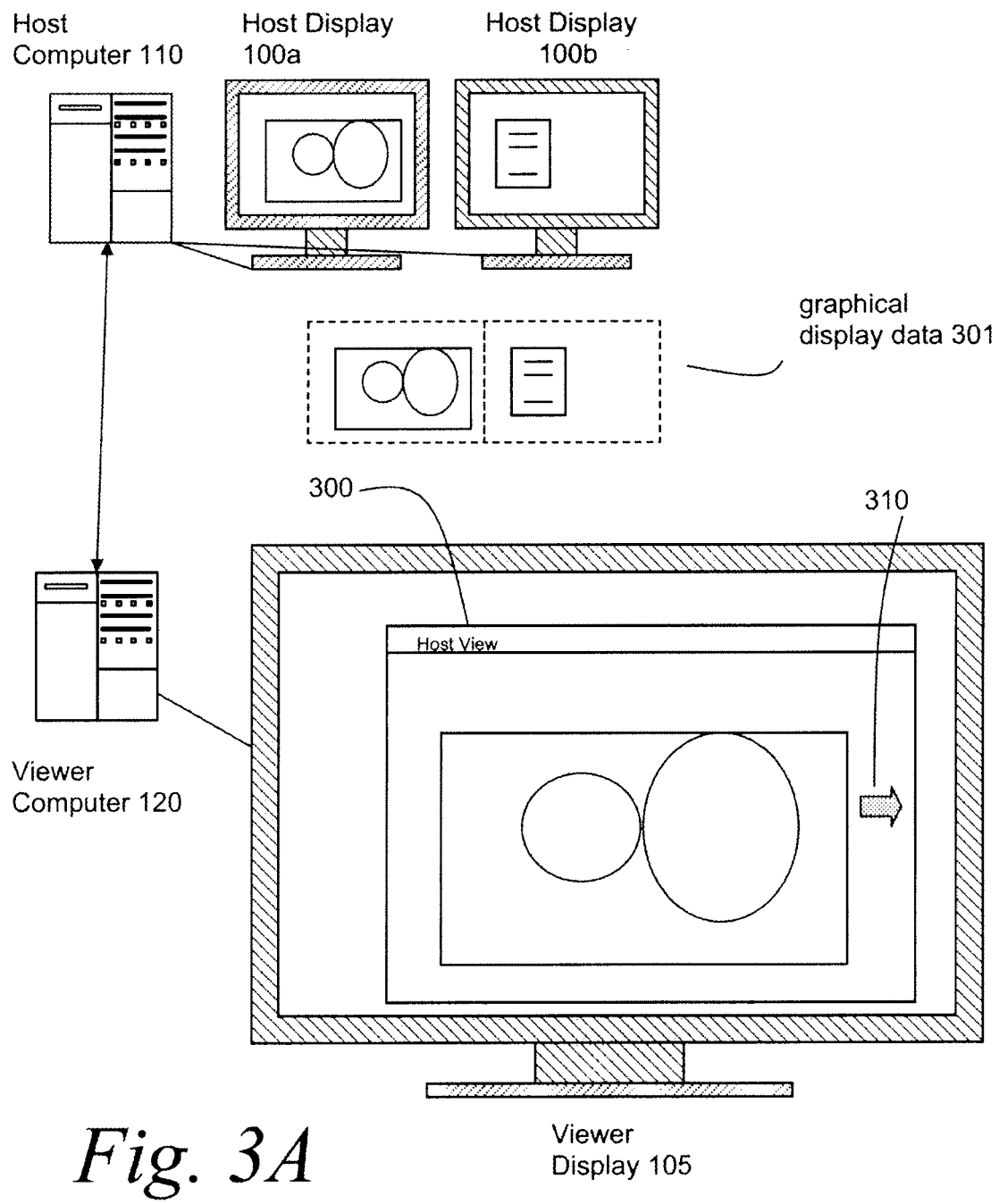
FIG. 3A is a block diagram of an embodiment of a remote access system providing functionality for viewing screen data from multiple monitors.

Referring now to FIG. 3A, a block diagram of one embodiment of a remote access system providing functionality for viewing screen data from multiple monitors is shown. In brief overview, a host computer 110 transmits graphical display data 301 corresponding to a plurality of host displays 100. In one embodiment, the graphical display data 301 relates to a list of rectangles, each rectangle corresponding to a given host display 100. The graphical display data 301 is received by a viewer computer, and some or all of the graphical display data 301 is then displayed in a window on the viewer display 105.

Still referring to FIG. 3A, now in greater detail, a host computer 110 transmits graphical display data 301 corresponding to a plurality of host displays 100. The graphical display data 301 may correspond to any number of host displays, including without limitation 2 displays, 3 displays, 4 displays, 5 displays, 8 displays, 16 displays and 32 displays. In another embodiment, the graphical display data 301 relates to a representation of the graphical display as it would be shown on the host displays. In some embodiments, the host displays may not actually be displaying the corresponding graphical display data. For example, the host displays 100 may be turned off, or configured to be inactive in some circumstances where the host computer is transmitting the graphical display data 301 to a viewer computer.

The graphical display data 301 may be transmitted using any technique, and via any network. The graphical display data 301 may be compressed, translated, or otherwise modified for transmission. For example, commonly or repeatedly occurring icons or tiles may be cached on the viewer computer. Or, for example, a data compression function may be used to reduce the size of the transmitted graphical display data 301.

As discussed above, in one embodiment the graphical display data 301 relates to a list of rectangles 301. Each rectangle may in turn correspond to a given host display. In some embodiments, a rectangle may correspond to a given portion of a host display. The rectangles may include any means for specifying the rectangular boundaries of a host display. In some embodiments, the list of rectangles may be transmitted as a single list of rectangles. In other embodiments, the list of rectangles may be transmitted as a series of lines or dimensions which serve to specify one or more rectangles. In some embodiments, the list of rectangles may be compressed using a data compression technique. In some embodiments, the host may only send the list of rectangles to the viewer once. In other embodiments the host may send the list of rectangles in response to a request from the viewer computer. In still other embodiments, the host may send the list of rectangles a plurality of times.

For example, with reference to this embodiment, a host computer may have two displays, each with a resolution of 800 pixels by 600 pixels, arranged side-by-side. The host computer may transmit graphical display data for the combined 1600×600 viewing area provided by both host displays operating in conjunction. The host may then transmit a list of two rectangles corresponding to the viewing areas of the respective displays, which in this example may include the rectangles: [(0,0) (0,599) (799,599) (799,0)] and [(800,0) (800,599) (1599,599) (1599,0)]. In other embodiments, this list of rectangles may be transmitted using other means for specifying the rectangles. For example, the host may transmit the coordinates of lines with the graphical display data which correspond to the separation between one or more monitors.

As a second example, a host computer may have three graphical displays, two having a resolution of 800 pixels by 600 pixels and one having a resolution of 1600 pixels by 1000 pixels. The monitors may be arranged in a configuration such that the total viewing area is 1600 pixels by 1600 pixels, with the two 800×600 monitors displaying the upper portions of the viewing area, and the 1600×1000 monitor displaying the lower portion of the viewing area. The host may transmit graphical display data for the monitors, and transmit a list of rectangles corresponding to the viewing area of each display. In this example, the list may include the rectangles: [(0,0) (0,599) (799,599) (799,0)] and [(800,0) (800,599) (1599,599) (1599,0)] and [(0,600) (0,1599) (1599,1599) (1599,0)].

The viewer computer may then display some or all of the graphical display data. In one embodiment, the viewer computer displays some or all of the graphical display data in a dedicated window 300. In some embodiments, the dedicated window 300 may occupy the full screen of one or more viewer displays.

The dedicated window 300 may display any portion of the transmitted graphical display data. In one embodiment, the dedicated window may display a given subset of the graphical display data corresponding to the resolution of the dedicated window. For example, if the dedicated window 300 has a resolution of 400 pixels by 300 pixels, the dedicated window may display a 400×300 area of the received graphical display data, which may be any resolution.

In some embodiments, the viewer may display a dedicated window 300 across more than one viewer display. For example, if the resolution of the received graphical display data is 1600 pixels by 1000 pixels and the viewer computer has two displays, each with 1200×800 resolution, the viewer computer may display a dedicated window of 1400 pixels by 700 pixels of the received graphical display data.

In one embodiment, the viewer computer may automatically determine a configuration for displaying the received graphical data on a plurality of viewer monitors. For example, the viewer may expand the display window first vertically and then horizontally such that the display window occupies the largest available rectangular area of the plurality of viewer displays.

In some embodiments, the dimensions of the received graphical display data may be larger than the dedicated window 300. In these embodiments, the dedicated window may provide a scrolling feature such that the user can navigate the dedicated window to display different areas of the received graphical display data. For example, if the user moves a mouse pointer near an edge of the window 300, the window may scroll in the direction of the edge to reveal additional areas of the received graphical data 301. Or, for example, the window may provide scroll bars or buttons for scrolling.

In some embodiments, a dedicated window may display the entirety of the received graphical display data corresponding to a given host display. In some embodiments, the user may select a subset of a plurality of host displays will be displayed in the dedicated window 300. In some embodiments this may be a result of the user selecting that particular host display 100a for viewing. In some embodiments, the dedicated window 300 may further provide functionality for the user to lock scrolling of the window. In still other embodiments, the window may automatically lock scrolling of the window if the viewer computer determines that an entire host display is represented in the window 300.

In some embodiments, a dedicated window 300 may include an indicator 310 which indicates the direction of a display not currently shown in the window. An indicator 310 may utilize any graphical indication, including an arrow, icon, graphical distortion, or thumbnail. For example, in one embodiment an indicator 310 may be an arrow of a given color overlaying a portion of the window. In a second example, an indicator may include a thumbnail of the display not currently shown. In another embodiment, an indicator 310 may display a graphical change in the window border, such as a highlighting of the border. In still another embodiment, an indicator 310 may have an icon or graphical representation displayed outside of the window. For example, a separate interface window may be displayed alongside the dedicated window 300 having indicators 310 and other navigation tools.

In some embodiments, a window 300 may have a plurality of indicators 310, indicating the direction of a plurality of host displays not currently shown. Indicators may indicate any direction corresponding to a host display not shown, including left, right, up, down, or diagonally. In some embodiments, an indicator 310 may also indicate distance. For example, a host computer may have three host displays, H1, H2, and H3, arranged left-to-right. If a window of a viewer computer is currently displaying graphical data corresponding to display H1, the window may utilize a first indicator pointing right and indicating the direction of H2, such that if the user clicks the indicator the window will transition to displaying graphical data corresponding to H2. The window may also have a second indicator pointing right indicating the direction of H3, such that if the user clicks the indicator the window will transition to displaying graphical data corresponding to H3. The indicator corresponding to H3 may be displayed smaller, darker, or otherwise distinguished from the indicator corresponding to H2 in order to indicate to the user that the indicator corresponds to a host display not contiguous to the display currently shown.

In some embodiments, a user activating an indicator 310 may cause the window to transition to displaying the graphical data corresponding to the host display in the direction of the indicator. In one embodiment, a user may activate an indicator 310 by clicking on the indicator. In another embodiment, a user may activate an indicator by using a keyboard shortcut.

In FIG. 3A, the dedicated window 300 shows a representation of graphical data corresponding to the host display 100a. In the example shown, the indicator 310 indicates that the display of the host display 100b, which is not currently shown, exists to the right of the graphical data displayed in the window. If a user clicks on or otherwise activates the indicator 310, the dedicated window may transition to displaying the graphical data corresponding to the host display 100b, as is shown in FIG. 3B.

Figure 3B:
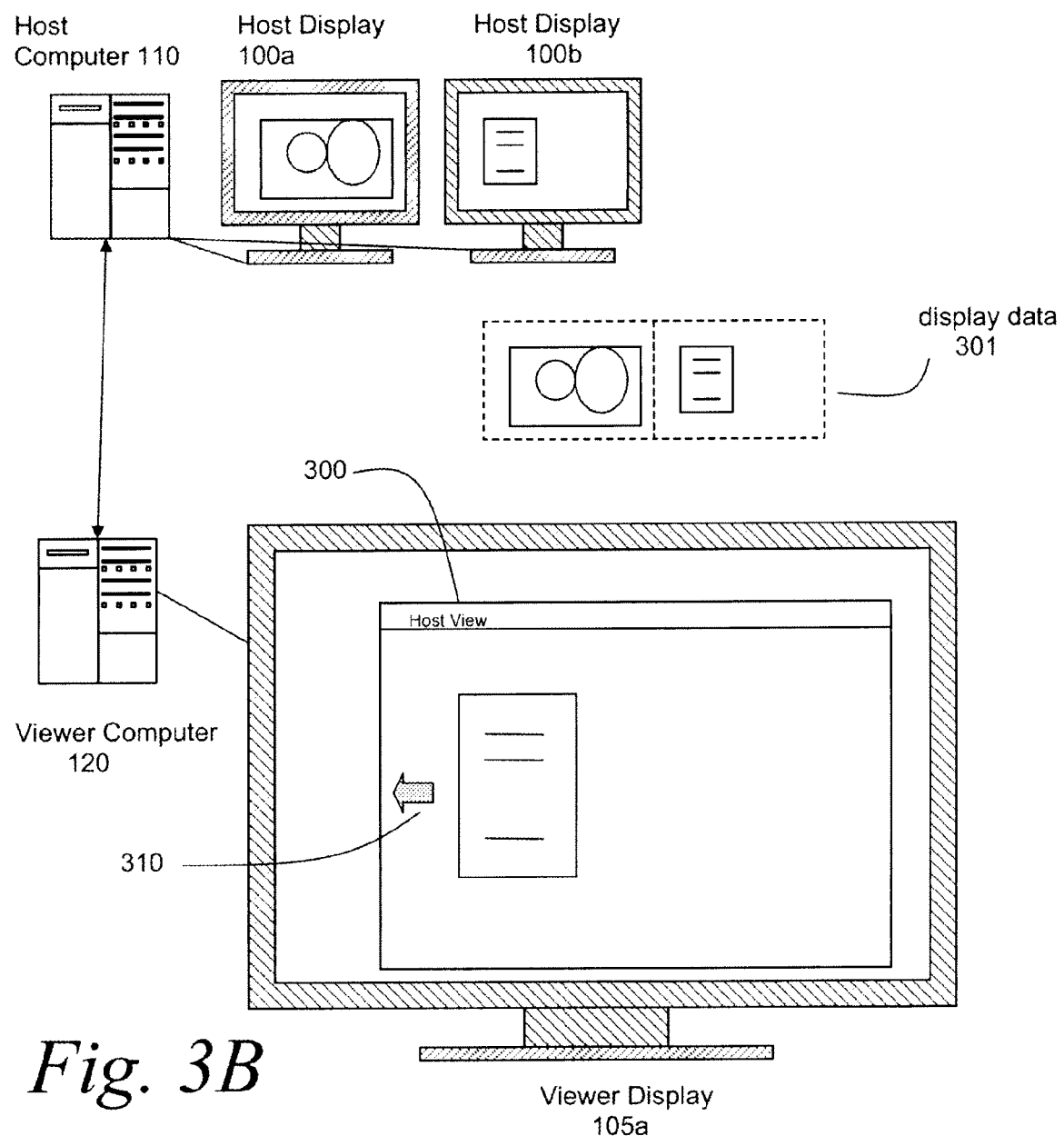
FIG. 3B is another block diagram of an embodiment of a remote access system providing functionality for viewing screen data from multiple monitors.

Referring now to FIG. 3B, a second block diagram of one embodiment of a remote access system providing functionality for viewing screen data from multiple monitors is shown. In brief overview, a host computer 110 transmits graphical display data corresponding to a plurality of host displays 100. The graphical display data 301 includes a list of rectangles, each rectangle corresponding to a given host display 100. The graphical display data is received by a viewer computer, and some or all of the graphical display data is then displayed in a window on the viewer display 105.

Still referring to FIG. 3B, the dedicated window 300 shows a representation of graphical data corresponding to the host display 100b. In the example shown, the indicator 310 indicates that the display of the host display 100a, which is not currently shown, exists to the left of the graphical data displayed in the window. If a user clicks on or otherwise activates the indicator 310, the dedicated window may transition to displaying the graphical data corresponding to the host display 100b, as is shown in FIG. 3B.

Figure 3C:
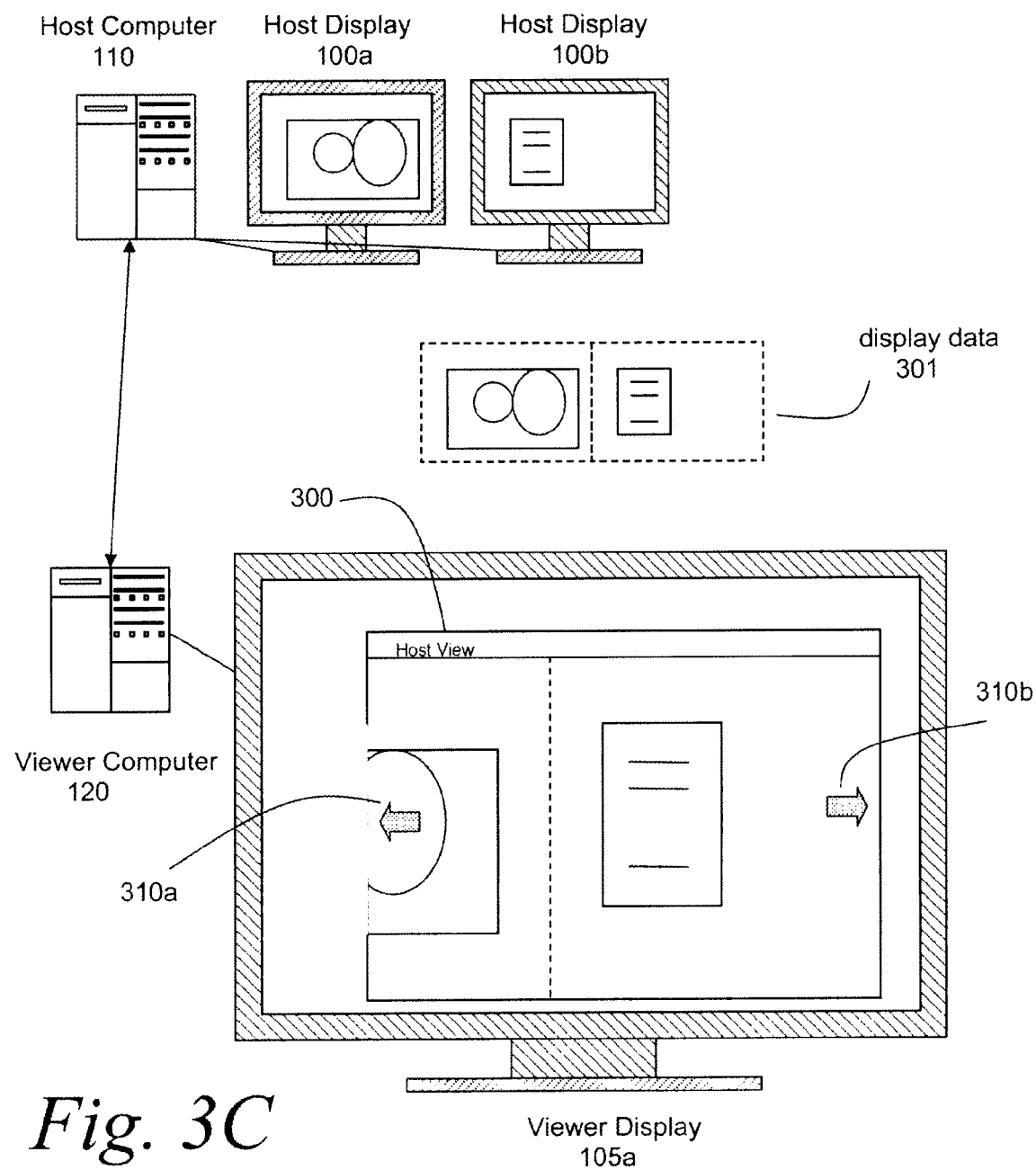
FIG. 3C is yet another block diagram of one embodiment of a remote access system providing functionality for viewing screen data from multiple monitors.

Referring now to FIG. 3C, a third block diagram of one embodiment of a remote access system providing functionality for viewing screen data from multiple monitors is shown. In brief overview, a host computer 110 transmits graphical display data corresponding to a plurality of host displays 100. The graphical display data 301 includes a list of rectangles, each rectangle corresponding to a given host display 100. The graphical display data is received by a viewer computer, and some or all of the graphical display data is then displayed in a window on the viewer display 105.

Still referring to FIG. 3C, the dedicated window 300 shows a representation of graphical data corresponding to a portion of the host display 100a and a portion of the host display 100b. The window may provide functionality for the user to scroll between the two host displays, for example by moving a mouse pointer near an edge to which the user wishes to scroll. The window also has two indicators 310, each indicating the direction of undisplayed graphical data corresponding to a host display. In one embodiment, a user clicking on an indicator may cause the window to transition to displaying the graphical data corresponding to the host display in the direction of the indicator. For example, a user clicking on the indicator 310a may transition the window to the display as shown in FIG. 3A, while a user clicking on the indicator 310b may transition the window to the display shown in FIG. 3B.

Figure 4:
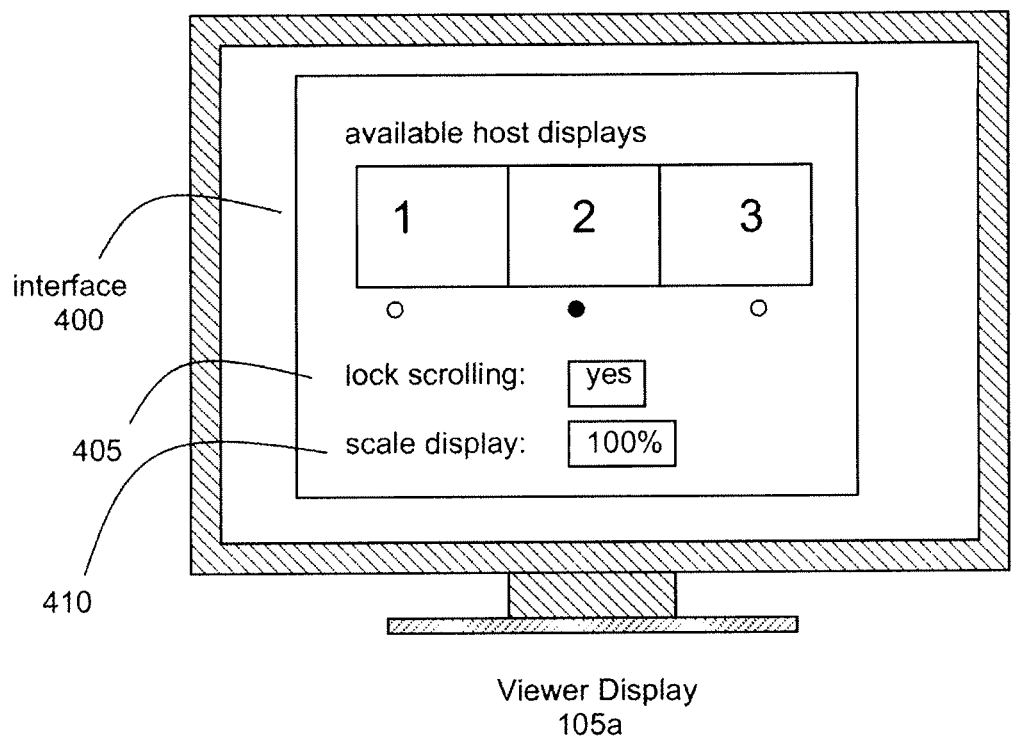
FIG. 4 is a block diagram of an embodiment of an interface including means for selecting a configuration for displaying a window representing screen data of a plurality of host displays in the viewable area of the one or more displays of a viewer computing device.

Referring now to FIG. 4, a block diagram of one embodiment of an interface including means for selecting a configuration for displaying a window representing screen data of the plurality of host displays in the viewable area of the one or more displays of the viewer computing device is shown. In brief overview, an interface 400 includes input means for a user to select one or more displays to be shown. The interface also has input means for a user to select whether the window scrolling will be locked, and whether the received graphical data will be scaled in the window.

Still referring to FIG. 4, an interface 400 includes input means for a user to select one or more displays to be shown. In the embodiment shown, a number of host displays may each be represented with a checkbox or button which allows the user to specify which displays the user would like to be shown in a dedicated window 300. In other embodiments, the input means may be a menu, slider, or button. In one embodiment, the input means may have a drag-and-drop interface wherein the user can drag one or more representations of host displays into a blank space representing the layout of the dedicated window 300.

An interface may also have an input for the user to specify whether scrolling will be locked. If a user specifies that scrolling is locked, a dedicated window 300 will not provide scrolling functionality, and the user may instead use indicators 310 to navigate among a plurality of host displays.

An interface 400 may also have an input for the user to specify whether one or more host displays will be scaled for display on a viewer display. In some embodiments, this input may be a feature of the drag-and-drop interface discussed above. For example, the user may be able to drag one or more representations of host displays into a blank space representing the layout of the dedicated window 300, and also resize the representations to indicate a scaling factor.

In some embodiments, the interface 400 may be displayed prior to the display of a window 300 displaying received graphical data 301. In other embodiments, the interface 400 may be displayed alongside a window 300 displaying received graphical data 301. For example, a separate window or widget may be provided which displays an overview of the host displays and the current configuration. A user may then click on the overview of a given host display to cause that given host display to be displayed in the dedicated window 300.

In some embodiments, an interface 400 may include functionality and inputs for a user to assign given host displays to given viewer displays. For example, if a host computer has three displays, and a viewer computer has two displays, the interface may allow a user to assign a first host display to the first viewer display, and a second host display to a second viewer display.

Figure 5A:
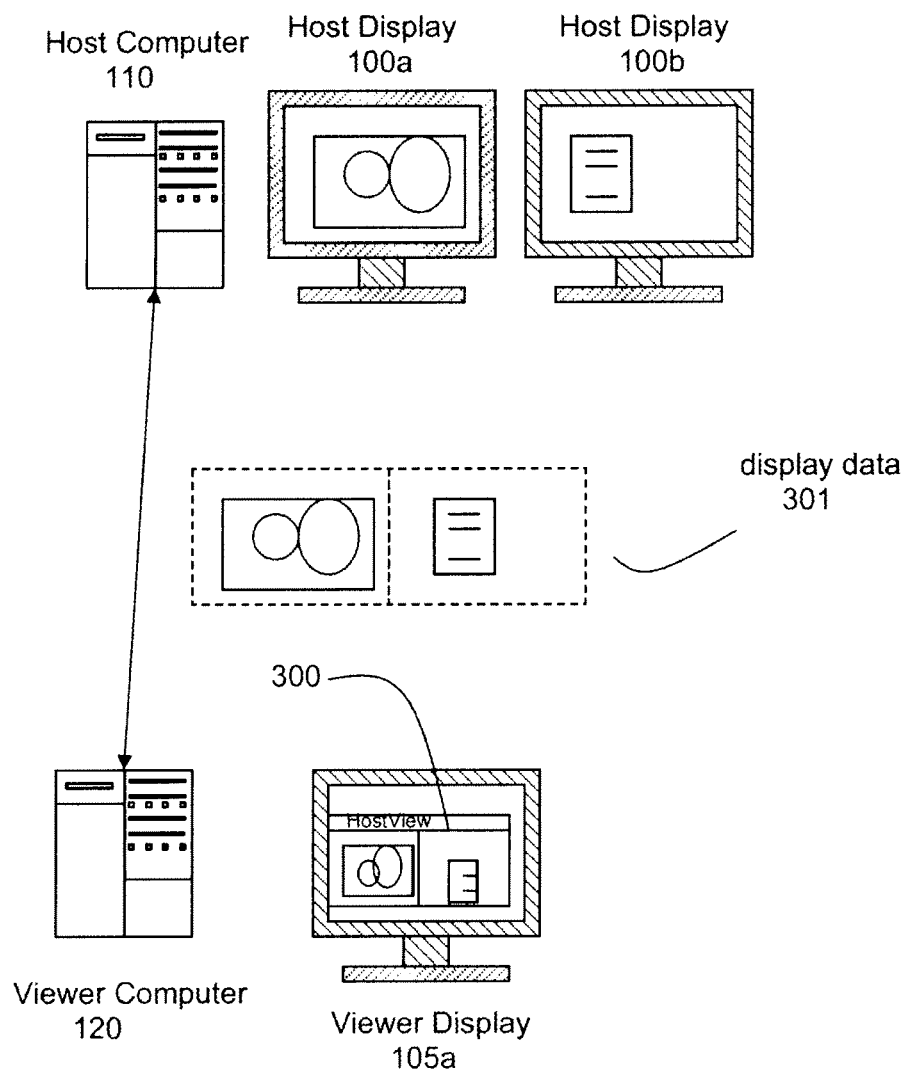
FIG. 5A is a block diagram of an embodiment of a remote access system providing functionality for viewing scaled screen data from multiple monitors.

Referring now to FIG. 5A, a block diagram of one embodiment of a remote access system providing functionality for viewing scaled screen data from multiple monitors is shown. In brief overview, a host computer 110 transmits graphical display data corresponding to a plurality of host displays 100. The graphical display data 301 includes a list of rectangles, each rectangle corresponding to a given host display 100. The graphical display data is received by a viewer computer, and some or all of the graphical display data is then scaled and displayed in a window on the viewer display 105.

Still referring to FIG. 5A, now in greater detail, the viewer display 105 has a window 300 which displays scaled graphical data corresponding to one or more host displays. The received graphical data may be scaled by any factor. In some embodiments, the received graphical data may be scaled such that it occupies a larger screen area. In some embodiments, the received graphical data may be scaled such that it occupies a smaller screen area. In some embodiments, the received graphical data corresponding to each of the host displays may be scaled by an equal factor. In other embodiments, the received graphical data corresponding to each of the host displays may be scaled by a plurality of different factors. For example, if a host computer had two displays, one significantly larger than the other, the received graphical data corresponding to the larger display may be scaled to occupy a larger screen area such that the graphical data appears to a viewer as it would on the host display.

In some embodiments, the viewer computing device may scale the graphical data such that it exactly occupies a given window size. In some embodiments, the viewer computing device may scale the graphical data such that the graphical data corresponding to a given host display exactly occupies a given window size. In other embodiments, the viewer computing device may scale the graphical data such that the graphical data corresponding to a given plurality of host displays exactly occupies a given window size.

Figure 5B:
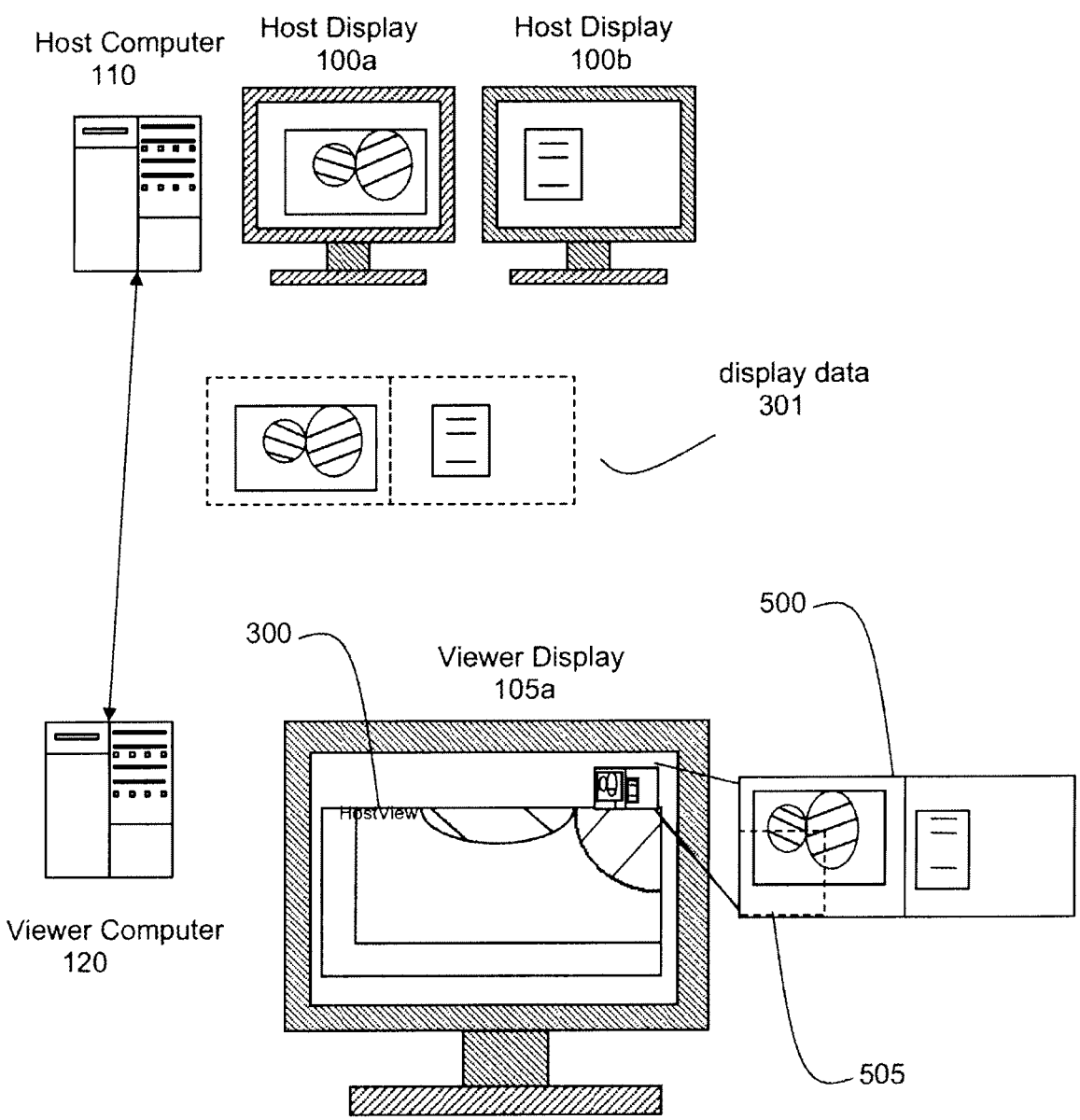
FIG. 5B is a block diagram of another embodiment of a remote access system providing functionality for viewing scaled screen data from multiple monitors.

FIG. 5B presents another embodiment of a remote access system in accord with the present invention that allows a user to view screen data from one or more monitors. In brief overview, a host computer 110 transmits to a viewer computer 120 graphical display data 301 corresponding to at least one of a plurality of host displays 100a, 100b. The graphical display data 301 may include, for example, a list of rectangles, each rectangle corresponding to a given host display 100. Graphical display data 301 may also include, either additionally or in the alternate, data relating to the images displayed on the host display(s) 100, including but not limited to their size, colors, and brightness. To facilitate communication of the graphical display data 301, the graphical display data 301 may be compressed prior to transmission.

With continued reference to FIG. 5B, the graphical display data 301 is received by the viewer computer 120 where it is processed for display on at least one viewer display 105. Although FIG. 5B depicts a viewer computer 120 having a single viewer display 105, the scope of the present invention also encompasses a viewer computer 120 having more than one viewer display 105, where each viewer display 105 has its own discrete desktop space or, alternately, a desktop space is shared among one or more viewer displays 105. Where there is a difference in size or resolution between the host display(s) 100 and the viewer display(s) 105, the graphical display data 301 may be scaled so that part or all of the images from the host display(s) 100 appear on the viewer display(s) 105, for example, in a window or windowless display.

The display of the graphical display data 301 is accompanied by a control 500 that, as depicted in FIG. 5B, may appear as a floating pallet. In other embodiments, the control 500 may appear as, for example, an anchored palette, or a separate bordered or borderless window appearing at a predetermined location or at a location of the user's choice. In certain embodiments, the control 500 may be subsequently moved, rearranged, or resized by the user to facilitate its use and operation. The end user of the viewer computer 120 may invoke the presentation of the control 500, e.g., using a predetermined or user-specified keystroke or mouse gesture.

The control 500 may itself be a scaled version of the display data 301, with the scaling factor selected to make the control 500 a size chosen by the end user or otherwise suited to use by the end user. In some embodiments, the control 500 may be rescaled such that it occupies a larger screen area. In other embodiments, the control 500 may be rescaled such that it occupies a smaller screen area.

Where, for example, the host computer 110 has a plurality of host displays 100, the control 500 may itself be composed of a plurality of tiles, with each tile corresponding to one of the host displays 100. The plurality of tiles composing the control 500 may also be disproportionately sized relative to each other such that, for example, the tile in the control 500 corresponding to host display 100a is larger than the tile in the control 500 corresponding to host display 100b. This mechanism may be used to accommodate a host computer 110 having two displays 100, one significantly larger than the other, with the two tiles in the control 500 scaled to occupy space on the viewer display(s) 105 proportionate to their display sizes. A similar distinction may be made by varying the color or brightness of the tiles composing the control 500.

Once displayed, the control 500 may be used to select that portion of the images from the host display(s) 100 that appear on the viewer display(s) 105. With reference to FIG. 5B, in one embodiment the control 500 typically has a marker 505 superimposed to highlight the portion of the host display(s) 100 that is currently displayed on the viewer display(s) 105 with respect to the images displayed on the entirety of the host display(s) 100 desktop area. This proportion may also be determined by comparing the portion of the host display(s) 100 that is currently displayed on the viewer display(s) 105 against the entirety of the received display data 301. Alternately, the control 500 may lack such a marker 505.

In this embodiment, the user may change the portion of the images from the host display(s) 100 shown on the viewer display(s) 105 by repositioning the marker 505 on the control 500. Similarly, the user may affect the overall portion of the host display(s) 100 appearing on the viewer display(s) 105 by stretching the marker 505 to encompass a greater portion of the control 500, thereby signaling the embodiment to change the overall scaling of the portion of the host display(s) 100 presented on the viewer display(s) 105 to correspond to the new proportion specified by the resized marker 505. In another embodiment, the control 500 may lack a marker 505 but still behave in response to user actions, e.g., mouse clicks or keystrokes, as described.

Similarly, in this and other embodiments the user may change that portion of the images from the host display(s) 100 that appear on the viewer display(s) 105 by pointing and clicking on the control 500 using a mouse or other input device, or utilizing a predetermined or user-selected keystroke or keystroke combination.

The display data 301 serving as the basis for the displayed control 500 may change in real-time and, accordingly, in one embodiment of the present invention the displayed control 500, being a scaled version of that display data 301, may itself change in real-time, such that the control 500 provides a scaled view of the host display(s) 100 as they operate. Alternately, the presentation of the control 500 may change from time-to-time, such that the control 500 provides a scaled view of the host display(s) 100 that is from time-to-time refreshed as it operates. In still other embodiments, the control 500 may not change at all and may, accordingly, comprise an appropriately-sized geometric shape having a solid fill color. As above, these various implementations of the control 500 may have or lack an overlaid marker 505 to facilitate navigation on the viewer display(s) 505, or the user may interact with the control 500 using other interface mechanisms well known to the art.

Figure 6:
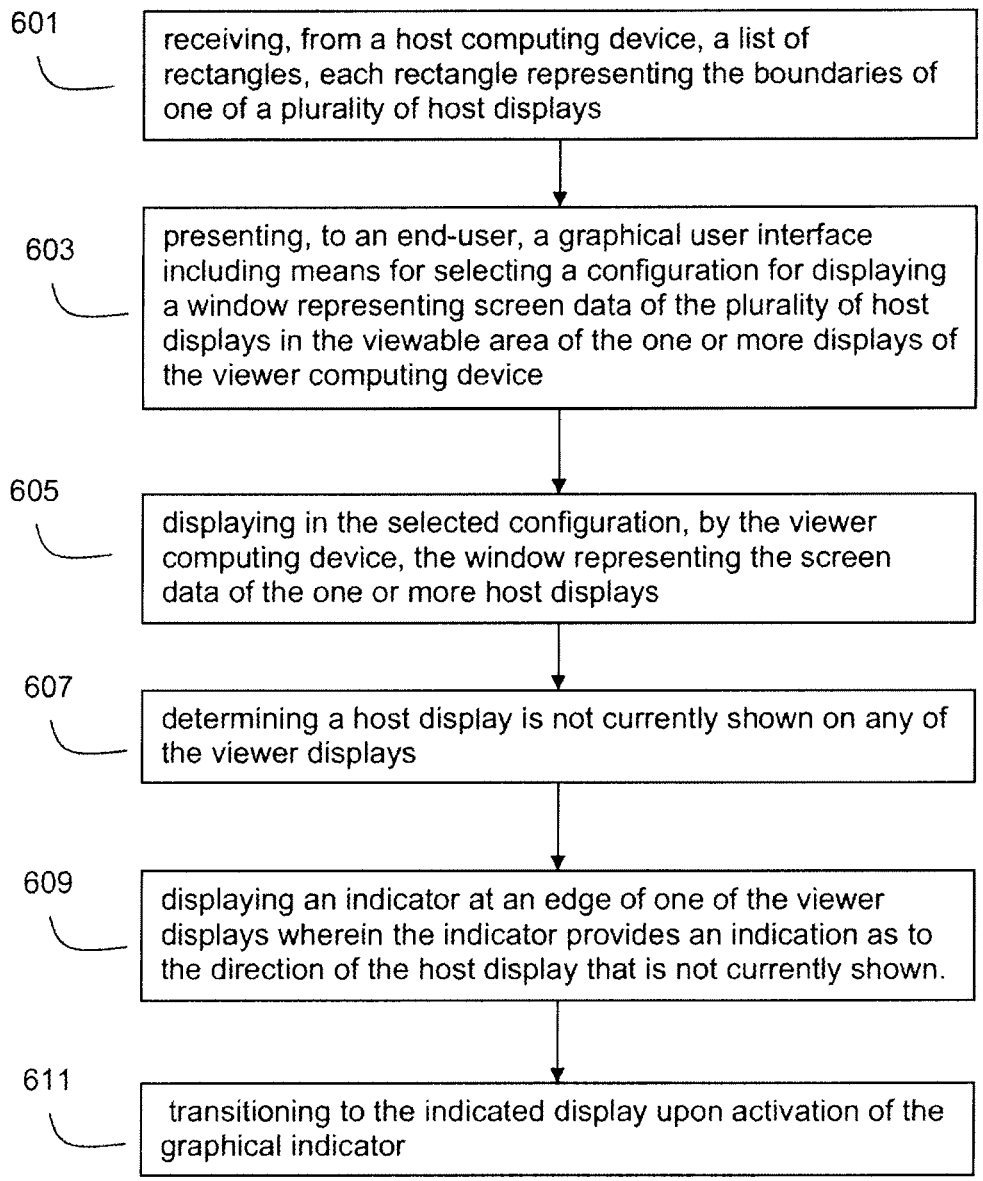
FIG. 6 is a flow diagram of a method for supporting multiple display configurations in a remote access environment.

Referring now to FIG. 6, a method of supporting multiple display configurations in a remote access environment is shown, wherein the remote access environment has a host computing device in communication with a plurality of host displays and a viewer computing device in communication with one or more viewer displays, the host computing device and viewer computing device in communication via a network. In brief overview, the method includes: receiving from a host computing device, by a viewer computing device having one or more viewer displays, a list of rectangles, each rectangle representing the boundaries of one of a plurality of host displays (step 601); presenting, by the viewer computing device to an end-user of the viewer computing device, a graphical user interface including means for selecting a configuration for displaying a window representing screen data of the plurality of host displays in the viewable area of the one or more displays of the viewer computing device (step 603); and displaying in the selected configuration, by the viewer computing device, the window representing the screen data of the one or more host displays (step 605). The method may further include determining a host display is not currently shown in the window (step 607); displaying an indicator at an edge of the window, wherein the indicator provides an indication as to the direction of the host display that is not currently shown (step 609); and transitioning to the indicated display upon activation of the graphical indicator (step 611).

Still referring to FIG. 6, now in greater detail, a viewer computing device having one or more viewer displays receives, from a host computing device, a list of rectangles, each rectangle representing the boundaries of one of a plurality of host displays (step 601). This step may be performed in accordance with any of the embodiments described herein. In some embodiments, the viewer computing device may have a single viewer display. In other embodiments, the viewer device may have a plurality of displays. In some embodiments, the host computing device may have two host displays. In still other embodiments, the host computing device may have three or more host displays.

In some embodiments, the list of rectangles may be received simultaneously to receiving graphical data corresponding to one or more host displays. In other embodiments, the list of rectangles may be received before or after receiving graphical data corresponding to one or more host displays.

The viewer computing device may present, to an end-user of the viewer computing device, a graphical user interface including means for selecting a configuration for displaying a window representing screen data of the plurality of host displays in the viewable area of the one or more displays of the viewer computing device (step 603). This interface may include any input means, including without limitation buttons, sliders, checkboxes, menus, drag-and-drop fields, and resizable boxes. A configuration may involve sizing, positioning, selecting, or otherwise adjusting the graphical representation of one or more host displays. In some embodiments, a user may be able to save and retrieve previously used or common configurations.

In some embodiments, the interface may be displayed before a window representing screen data is displayed. In other embodiments, the interface may be displayed during the display of a window representing screen data. In some embodiments, the interface may include a window or widget for selecting and configuring the display of one or more host displays. In some embodiments, the interface may include a button or indicator which allows a user to select one or more host displays for viewing.

The viewer computing device may then display, in the selected configuration, the window representing the screen data of the one or more host displays (step 605). In some embodiments, the window may be displayed on a single viewer display. In other embodiments, the window may be displayed on a plurality of viewer displays.

The viewer computing device may then determine a host display is not currently shown in the window (step 607). In some embodiments, this step may be performed by computing whether the graphical data corresponding to one or more of the received rectangles is not in the window. In some embodiments, the viewer computing device may determine that an entire host display is not currently shown in the window. In another embodiment, the viewer computing device may determine that a portion of a host display is not currently shown in the window.

The viewer computing device may display an indicator at an edge of the window, wherein the indicator provides an indication as to the direction of the host display that is not currently shown (step 609). This indicator may include any indicator described herein.

The viewer computing device may also transition to the indicated display upon activation of the graphical indicator (step 611). This step may be performed according to any of the embodiments described herein. In some embodiments, a viewer computing device may lock scrolling of the window upon a determination that one or more host displays are completely visible within the window.

It will therefore be seen that the foregoing represents a highly advantageous approach to remote access when the host computer and the remote computer have disparate display configurations. The terms and expressions employed herein are used as terms of description and not of limitation and there is no intention, in the use of such terms and expressions, of excluding any equivalents of the features shown and described or portions thereof, but it is recognized that various modifications are possible within the scope of the invention claimed.

What is claimed is:

1. A method for remotely viewing, at a display of a client computing device, at least a portion of a plurality of displays connected to a single host computing device, the method comprising:
   receiving, at the client computing device, information relating to an image presented on the plurality of displays connected to the single host computing device;
   displaying a control derived from the received information, on a portion of the display of the client computing device, the control comprising a scaled version of the image and a repositionable marker superimposed on the scaled version of the image, wherein the scaled version of the image in the control is displayed over a plurality of subsections, the plurality of subsections corresponding to the plurality of displays connected to the single host computing device, and wherein at least one of the subsections is disproportionately sized relative to other subsections; and
   in response to the repositionable marker being manipulated on a selected area of the scaled version of the image, displaying, on the client computing device, a graphical representation of the selected area of the scaled version of the image.

2. The method of claim 1, further comprising manipulating the repositionable marker on the selected area of the scaled version of the image by repositioning or resizing the marker.

3. The method of claim 2, further comprising manipulating the repositionable marker in response to an action of an end-user of the client computing device.

4. The method of claim 3, wherein the action of the end-user of the client computing device comprises at least one of a key press or a click of a mouse.

5. The method of claim 1, wherein the received information comprises the image presented on at least one of the displays connected to the host computing device.

6. The method of claim 1, further comprising receiving the information relating to the image from the host computing device via a communications network.

7. The method of claim 1, wherein receiving the information relating to the image comprises receiving a compressed representation of the information relating to the image.

8. The method of claim 1, further comprising displaying the control at a predetermined location of the client computing device.

9. The method of claim 1, further comprising updating the scaled version of the image in response to an update in the image displayed at the host computing device.

10. A computer implemented system for remotely viewing, at a display of a client computing device, at least a portion of a plurality of displays connected to a single host computing device, the system comprising:
a transceiver arranged to receive, at the client computing device, information relating to an image presented on the plurality of displays connected to the single host computing device;
a controller part of a screen, derived from the received information and displayed on a portion of the display of the client computing device, the controller part of the screen arranged to display a scaled version of the image and a repositionable marker superimposed on the scaled version of the image, wherein the scaled version of the image in the controller part of the screen is displayed over a plurality of subsections, the plurality of subsections corresponding to the plurality of displays connected to the single host computing device, and wherein at least one of the subsections is disproportionately sized relative to other subsections; and
a viewer part of the screen arranged to display, on the display of the client computing device, a graphical representation of a selected area of a scaled version of the image responsive to the repositionable marker being manipulated on the selected area of the scaled version of the image.

11. The computer implemented system of claim 10, wherein the repositionable marker is manipulated on the selected area of the scaled version of the image by repositioning or resizing the marker.

12. The computer implemented system of claim 11, wherein the repositionable marker is manipulated in response to an action of an end-user of the client computing device.

13. The computer implemented system of claim 12, wherein the action of the end-user of the client computing device comprises at least one of a key press or a click of a mouse.

14. The computer implemented system of claim 10, wherein the received information comprises the image presented on at least one of the displays connected to the host computing device.

15. The computer implemented system of claim 10, wherein the transceiver is arranged to receive the information relating to the image from the host computing device via a communications network.

16. The computer implemented system of claim 10, wherein the transceiver is arranged to receive a compressed representation of the information relating to the image.

17. The computer implemented system of claim 10, wherein the control window is displayed at a predetermined location of the client computing device.

18. The computer implemented system of claim 10, wherein the control window is arranged to update the scaled version of the image in response to an update in the image displayed at the host computing device.

* * * * *